June 28, 1966  F. J. G. CLOUP  3,258,554
WEIGHING SCALE WITH ELECTRIC CONTROL SWITCHING MEANS
Filed July 10, 1964  2 Sheets-Sheet 2

3,258,554
WEIGHING SCALE WITH ELECTRIC CONTROL
SWITCHING MEANS
Francis Jean Gabriel Cloup, Paris, France
(% SRL Promat La Tresne, Gironde, France)
Filed July 10, 1964, Ser. No. 381,802
Claims priority, application France, July 12, 1963,
941,288; May 29, 1964, 976,413
3 Claims. (Cl. 200—56)

The invention relates to a system for controlling an electric circuit, and relates more particularly to the periodic magnetic making and breaking of electric contacts.

The invention has among its principal objects to provide a switch with two contacts, one being permanently influenced by the field of one magnet, and the other contact being capable to be influenced by either pole of a second magnet, depending on the position of the switch relative to the second magnet.

It is another object of the invention to move the second magnet and the switch relative to each other, so that the other contact will first be influenced by one and then by the other pole of the second magnet, to operate the switch oppositely, in succession.

It is still another object of the invention to create either magnetic field by a permanent magnet or with the aid of a solenoid, and to realize the polarization of one of the contacts by identical means.

It is moreover another object of the invention to weak first magnet and a strong second magnet, so that when the transverse neutral plane of the magnet passes the nonpolarized contact and there is no mutual reaction between the contact and the second magnet, the indicator will remain solely under the influence of the first magnet.

It is moreover another object of the invention to provide a single second magnet and a series of switches.

It is moreover a further object of the invention to provide a series of second magnets but only one switch.

It is still a further object of the invention to control with a switch of this type an electric circuit that has a certain influence on the operational cycle, for instance a weighing scale, the indicator of which carries a permanent first magnet that moves with a polarized magnetic contact; the permanent magnet will be deflected by the indicator in such a manner that its axis is perpendicular to said second magnet.

It is yet a further object of the invention to provide such a scale that is usable in a known manner with a hopper to weigh the aggregates necessary to the preparation of concrete on construction sites.

It is known that on the sites there is mounted a supply heap for different aggregates, segregated and heaped by categories in sectors that converge all towards a distributor. In the vicinity of the distributor there is provided in each sector an opening which is regulated by a closure lid or valve, by hand, or automatically, to permit the separation of the aggregates in a weighing hopper.

On such a site it is now current practice to place the different aggregates in sectors disposed behind a supply heap and to provide at the top of each sector an opening to feed the aggregates into a weighing hopper on which a scale is mounted. Each opening is provided with a valve to control the flow of the aggregates into the hopper.

It is another object of the invention still to provide different contacts that permit the automatic control of the different valves for opening as well as for closing.

It is a further object of the invention still to provide that one contact is carried by the indicator in the radial direction; a plurality of second magnets is placed tangentially on the periphery of the scale preferably by means of slides that are regulatable angularly by sliding on a circular rail.

With the above and other objects of the invention in view, the invention consists in the novel construction, arrangement and combination of various devices, elements and parts, as set forth in the claims hereof, certain embodiments of the same being illustrated in the accompanying drawings and described in the specification.

Figure 1:
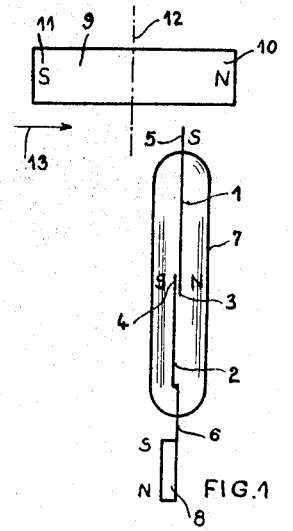
FIG. 1 is a schematic diagram showing the system in accordance with the invention, in an initial position.
Figure 2:
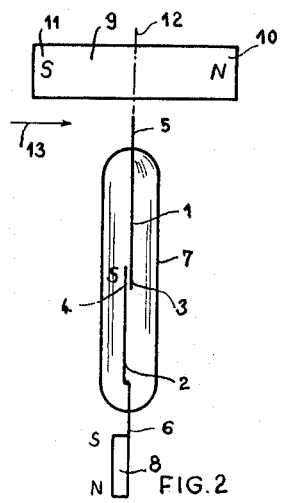
FIG. 2 is a schematic view, similar to FIG. 1, but showing a second position.
Figure 3:
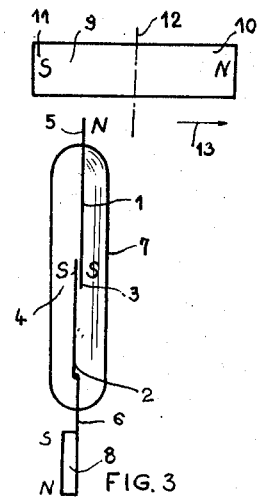
FIG. 3 is a schematic view, similar to FIGS. 1 and 2, but showing a third position.

In carrying the invention into effect in the embodiments which have been selected for illustration in the accompanying drawings and for description in this specification, and referring now particularly to FIGS. 1–3, the control apparatus comprises a pair of switch contacts 1, 2 composed of magnetic blades or lamellae that are disposed in a protecting case or housing 7. The adjacent ends 3, 4 of the lamellae 1, 2 are superposed and the outer ends 5, 6 of the lamellae 1, 2 project out of the case 7; the case 7 generally is composed of glass.

The magnetic blade end 6 carries a permanent magnet 8; the poles "S" (South), "N" (North) of the magnet 8 are positioned as shown in FIGS. 1–3 of the drawing. As the blade 2 is made of magnetic material, and its end 4 is closest to the "S" pole of the permanent magnet 8, a polarity "S" is likewise created at said end 4 of the blade 2.

The ends 3 and 4 of the blades 1 and 2, respectively, form the contacts of the switch 3, 4.

Facing the end 5 of the magnetic lamella 1 which, in contrast to the blade 2, is not subjected to permanent polarization, there is provided across an air space from the end 5 a permanent magnet 9; the right end 10 of the magnet 9 is the North pole "N," the left end 11 the South pole "S" and the center line 12 indicates the transverse neutral plane.

It will be assumed that starting with the position of FIG. 1, the permanent magnetized bar or magnet 9 will be displaced (to the right) in the direction of the arrow 13, while the case 7 remains at standstill. As long as the magnetic lamella 1 is at the right hand side of the plane 12 of the magnet 9, it is magnetized by the magnetic field of the magnet 9 and this lamella 1 is magnetized, as shown in FIG. 1, namely one South pole "S" is established at the upper end 5 and a North pole "N" at the lower end 3. The lower end 3, on the other hand, faces the "S" polarity of the end 4 of the lamella 2. The two poles "S" and "N" of the ends 3, 4 will be attracted to each other, and will make contact thereby closing the switch 3, 4.

When the magnetized bar 9 in its travel in the direction 13 assumes the position shown in FIG. 2, the lamella 1 will be situated substantially in the neutral plane 12; the polarization of the lamella 1 in this position will disappear and, hence the attraction of the ends 3, 4 no longer persist, whereby the contact will be broken and the switch 3, 4 opened.

When the magnetized bar 9 is displaced still further in the direction of the arrow 13 and when the neutral plane 12 reaches beyond the lamella 1, and when the end 5 of the lamella 1 is in the zone of the magnet 9 to the left of the plane 12, the end 5 will be magnetized by the field of the magnet 9 and will show the characteristics of a North pole "N"; the lower end 3 of the lamella 1 will conversely have a South pole "S"; as the upper end 4 of the lamella 2 still shows the South pole "S" characteristic, the ends 3, 4 which have both "S" polarity, will repel each other, whereby the contact remains broken and the switch open. It will remain open until the magnetized bar 9 or another bar of this type is situated in front of the end 5 of the lamella 1, as indicated in FIG. 1. In that event, as described earlier, the contact 3, 4 will immediately be made, closing the switch. The moment of the magnetizing of the blade 1, as described, and the closing of the switch 3, 4 depends, of course, on the intensity of the magnetic field of the magnetic bar 9, and of the mechanical and physical characteristics of the magnetic blade 1.

The aforedescribed system may be used for the control of various electric circuits.

Figure 4:
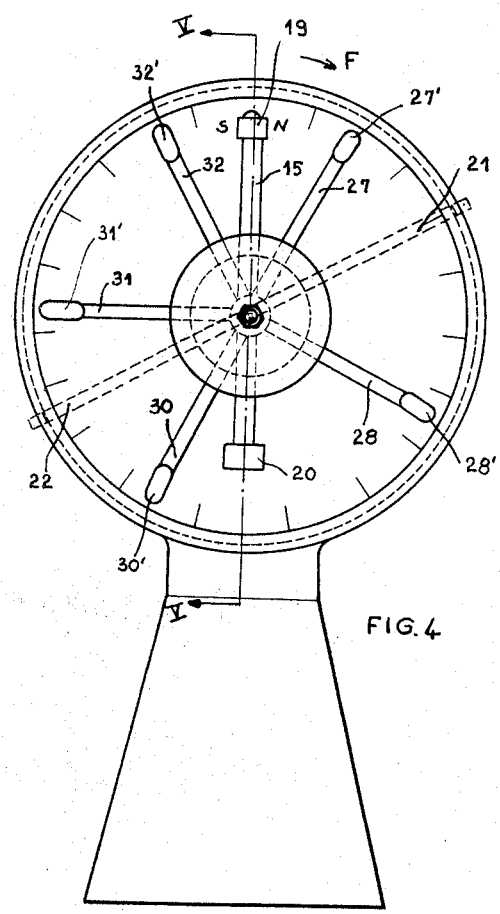
FIG. 4 is a front elevational view of a weighing scale having arrangements according to FIGS. 1 to 3.
Figure 5:
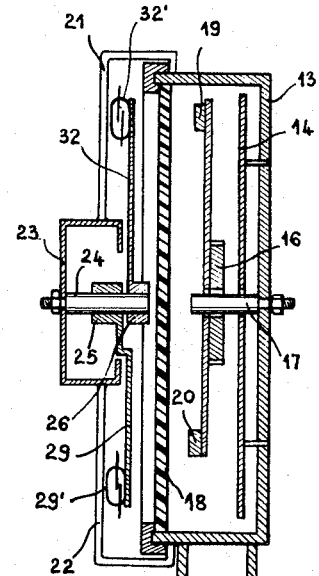
FIG. 5 is a sectional view of FIG. 4, taken along the line V—V of FIG. 4.

In FIGS. 4 and 5 there is shown, by way of exemplification, a scale for weighing the ingredients used in the mixing of concrete.

The scale has a case 13a in which the dial 14 is fixedly mounted. A rod 17 is fixed to the case 13a and protrudes through the dial 14. A hand 15 that carries a disk 16, is journalled movably on the rod 17. The case 13a is closed by a disk 18 that is made of glass or any other nonmagnetic material.

The hand 15 has a long "indicator" arm, and a short "counterbalance" arm, and is journalled on the rod 17 where the two arms meet.

Near the free end of the long indicator arm, the hand 15 carries a transverse magnetic bar 19, that corresponds to the bar 9 of FIGS. 1-3, the poles of which are designated "N" and "S" (FIG. 4). Near the free end of the short arm, the hand 15 is provided with a counterbalance weight 20.

As best shown in FIG. 5, a box 23 is attached to the case 13a, in front of the disk 18; the box 23 is attached by means of radial arms 21, 22. The box 23 carries a central rod 24 on which radial arms 27, 28, 29, 30, 31, 32 are mounted by means of friction sleeves 25, 26. These arms 27–32 are mutually angularly adjustable and with reference to the dial 14 of the weighing scale. Each of the radial arms 27–32 carries on its free end a contact switch with magnetic lamellae 27', 28', 29', 30', 31', 32' that correspond each to the lamella 1 of FIGS. 1–3; each of these contact switches furthermore has a lamella 2 of the type shown in FIGS. 1–3; and each contact switch is disposed with its lamellae in an electric circuit, not shown, that controls the weighing scale.

The hand 15 is movable relative to the contact switches 27'–32' and, conversely, these contact switches, once they have been adjusted to their positions, are at standstill relative to the hand 15.

The operation is as follows:

When the hand 15 moves (clockwise) in the direction of the arrow F in proportion to the quantity of the mass which the weighing hopper receives, the magnetic bar 19 will thereby move in succession before the contact switches 27'–32' and guide their closing and opening according to the magnetism transferred to the lamellae 2 of these contacts. Each of these contact switches is assigned to, and controls, the movement of a predetermined ingredient: namely, each switch controls the electric circuit for the opening and closing of the lid or control valve of the respective sector of the supply holder mentioned above.

According to a preferred embodiment, in connection with the control of the valves, when the needle 15 moves in the direction of the arrow F, and when the poles of the magnet 19 conform to the arrangement shown in FIG. 4, the polarization of FIG. 1 will be adopted for the lamellae 2 of all the contact switches 27'–32'. Each time the needle 19 will pass a contact switch 27' to 32', respectively, the respective contact switch will close or open, as described in connection with FIGS. 1–3. Preferably, the closing of the contact switch (see FIG. 2) will correspond to the preparation of the assigned valve, the opening (FIG. 2) will correspond to the closing of the valve, and to the opening of the succeeding valve, and the open position according to FIG. 3 will correspond to the complete opening of said succeeding valve.

Figure 6:
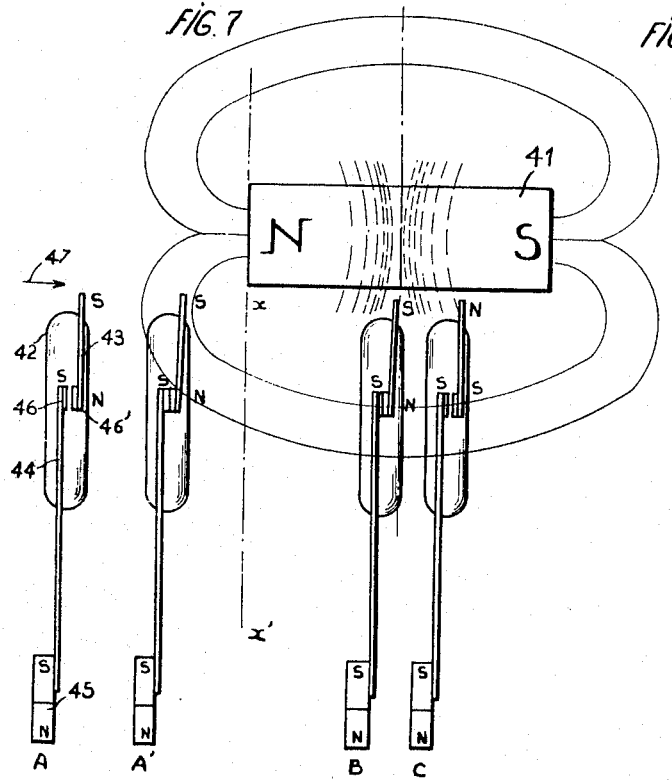
FIG. 6 is a schematic diagram, similar to FIGS. 1–3, but embodying a modification.

A modified system is shown in FIG. 6. A permanent magnet 41 is fixedly mounted, and a contact interrupter switch or interrupter or switch 42 of blades or lamellae 43 and 44 is movably arranged near the magnet 41; the inner contact end portions or contacts 46, 46' of the lamellae are enclosed in a protecting case. The lamella 44 is magnetized by means of a permanent magnet 45 in such a manner that the inner contact end 46 of the lamella 44 has a polarity "S" that is the opposite of the polarity which the switch 42 will first encounter when it moves (to the right) in the direction of the arrow 47 past the fixed magnet 41.

The strength of the polarizing magnet 45, however, is so arranged that it will be insufficient in itself to cause the closing of the contacts 46, 46' of the switch 42, but sufficiently strong to keep the contacts 46, 46' in closed position after the closing had been brought about by the field of the magnet 41.

The switch 42 is initially in the position A (FIG. 6) in which it is far enough from the pole N of the permanent magnet 41, so that the magnet 41 exercises no influence upon the interrupter 42. The curved solid lines that surround the magnet 41 represent the lines of flux of the magnetic field, and the broken lines the lines of equal force which are denser in the neutral center plane indicated by a dot-and-dash line.

The interrupter switch 42 is open and the poles of the inner ends 46 (S) and 46' (N) of the blades 43 and 44, respectively, are as indicated at A in FIG. 6 of the drawing. The contact is open between the ends 46 and 46' because the strength of the polarized magnet 45 is insufficient to surmount the mechanical resistance of the blades 43, 44 against closure of the gap between the ends 46, 46'.

When the interrupter 42 moves (to the right) in the direction of the arrow 47 and reaches in the field of the magnet 41 a point of sufficient intensity, the contact ends 46, 46' will interengage, thereby closing the switch 42. This closure occurs in the position A' of FIG. 6.

If for one or another reason, the closed interrupter 42 thereafter is not any longer influenced by the magnetic field of the magnet 41, the switch 42 will be maintained closed by the polarized magnet 45.

The switch 42 stays closed when the interrupter passes in the position B to the right of the neutral line of the magnet 41. The switch 42 will finally be opened in the position C, a little after passing the aforesaid neutral line, in the zone "S" of the opposite pole of the magnet in which the lines of equal force are dense.

This modification offers the following advantages:

(1) During its path in front of the fixed magnet 41, the interrupter 42 has two particular positions; namely a closure position in A', and an opening position in C.

(2) Because of the polarized magnet 45, the contact 46–46' closure is maintained even if the interrupter 42 escapes thereafter by chance the action of the field of the magnet 41.

(3) The opening of the switch 42 occurs in the zone of great density of the lines of equal force, which renders possible precise opening.

All these advantages are especially important when such an interrupter is used in combination with a scale that controls successive weighing of various materials.

Figures 7, 8:
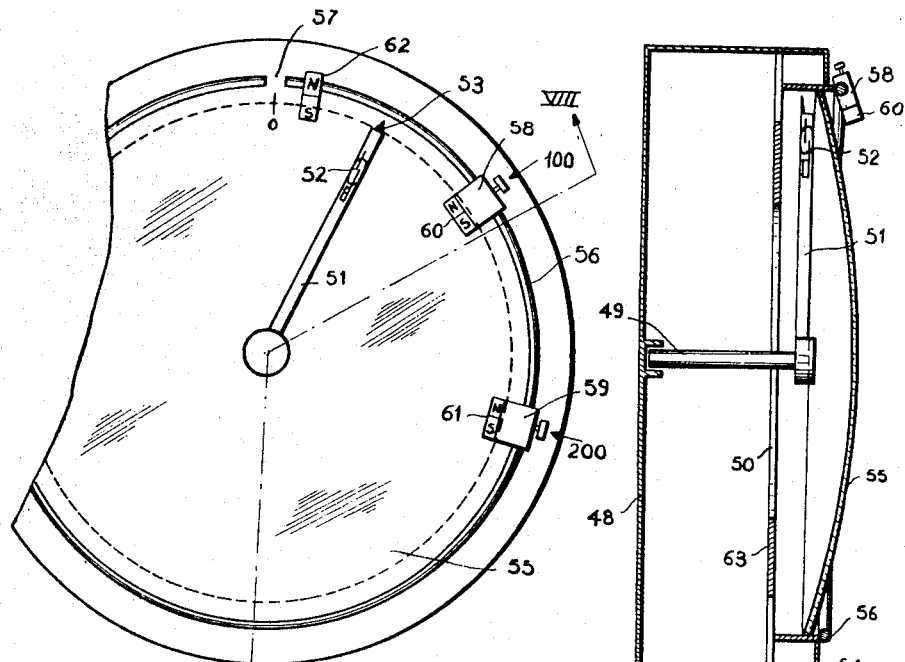
FIG. 7 is a fragmentary front elevational view of a detection scale.
FIG. 8 is a sectional view, taken on the line VIII—VIII of FIG. 7.

A scale equipped with such an interrupter is shown in FIGS. 7 and 8 wherein, for the sake of simplicity and clarity, only the essential elements are illustrated.

The reference numeral 48 designates the housing of the scale in which there are housed the parts (not shown) which direct the rotation of a shaft 49 which carries a radial indicator 51 that moves along a dial 50 of the housing 48, and the indicator 51 has on its free end a marker 53. On its outside the indicator 51 carries a lamellae-interrupter or interrupter switch 52, that is arranged radially of the indicator 51 and corresponds to the interrupter 42 of FIG. 6.

The marker 53 moves in front of a graduation 0, 100, 200, and so on, which is carried on the periphery of the dial 50. On the circumference of the dial 50 there is mounted by appropriate means a flange 54 which holds a protecting glass cover 55 and on which there is fixedly mounted a circular bar 56 open at 57. On this bar 56 there are mounted dogs 58, 59; their position may be adjusted, and each dog 58, 59 carries a permanent magnet 60, 61. These magnets are disposed tangentially of the periphery of a circle that is parallel to the circular path described by the switch 52. In the vicinity of the zero point of the scale dial 50, there is also mounted by means of a slide (not shown) a permanent magnet 62 that is disposed radially.

The blades of the interrupter are connected with the conductors of an electric circuit (not shown) that controls the discharge into a receiving hopper of a scale of two loose materials, and the magnets 60 and 61 are positioned, respectively, at the 100 kg. and 200 kg. marks. It is further assumed that first 100 kg. of a first material and then 100 kg. of the other material are poured into said hopper.

The operation is as follows:

As the outlet valve of a receptacle holding the first material is opened manually or automatically, the material discharges into the hopper and the indicator 51, owing to the weight of the first material as weighed by the indicator 51, will move clockwise from 0. At 0, the interrupter 52 is open. When the indicator 51 reaches an angular position in which the interrupter 52 has reached the field of the pole N of the magnet 58, the interrupter 52 will be closed and will stay closed until the interrupter 52 passes into the zone S of the magnet 58; passage past the neutral line into the zone S will cause the interrupter 52 to be opened, as described in FIG. 6. Opening of the interrupter 52 directs the reduction and cessation of the flow of the first material, and the start of the flow of the second material.

The added weight of the second material causes the clockwise displacement of the indicator 51 in the same direction as previously towards the magnet 59. When the interrupter 52 has reached a certain position with reference to the pole N of the magnet 59, the contact will close, causing the closing of the interrupter switch 52, which will bring about the reduction in flow of the second material. Reopening of the switch 52 will occur as before, soon after passage past the neutral line of the magnet 59 and will cause stoppage of the flow (at the weight of 200 kg.)

When after the weighing the indicator stands still again facing the zero mark of the dial 50, the switch 52 which it carries is closed under the action of the last tangential magnet 61. As the switch 52 must be opened for the start of a new weighing cycle, this opening is attained by means of a permanent magnet 62 identical with a tangential magnet but radially disposed, so that its pole which is in the vicinity of the interrupter, has the same polarity as the one utilized for the polarization of one of the lamellae of the interrupter.

Advantageously, this permanent radial magnet 62 is located beyond the zero mark of the dial which permits the contact to be in opening position before the zero.

The next step is emptying the hopper; the indicator moving in opposite direction comes back to the position 0 and the magnet 62 causes the opening of the interrupter, ready for another weighing cycle.

In a more general way it can be said that the position adopted by a switch 52 magnetized as hereinabove described, fixed on a needle or an indicator and which moves by magnets arranged along a measuring scale, permits to carry out at each passage of the indicator before a magnet of the scale two actions that serve various controls with precision.

The lines of force of the magnetic fields of all the tangentially arranged magnets may be concentrated due to a ring 63 (FIG. 8) mounted on the dial 50, that is composed of a magnetic material, such as iron.

I wish it to be understood that I do not desire to be limited to the exact details of construction shown and described, for obvious modifications will occur to a person skilled in the art.

Having thus described the invention, what I claim as new and desire to be secured by Letters Patent, is as follows:

1. A weighing scale, comprising in combination a dial including a graduation having a zero marking, a rotatable indicator journalled near said dial and operable to indicate thereon the weight on the scale, electric control switching means comprising a switch including a housing mounted on and movable with said indicator in a circular path, a plurality of field generating magnets adjustably mounted near the periphery of the path of said switch, said switch comprising two lamellae including adjacent end portions operable to make contact to close the switch, the end portion of one lamella being polarized and the other being subjectable to the action of the field of each of said magnets as said indicator carries said switch past said magnets, each of said magnets having two poles disposed tangentially of said path whereby, as the switch moves in said path from the zero position to positions of increased weight, the field of each magnet will first close the switch and thereafter open it as the switch moves past first one pole and then the other pole of each magnet.

2. A scale as claimed in claim 1, and a fixed field generating magnet being situated near the zero marking of the graduation and being disposed radially and being operable to open the switch before it reaches the zero position during its return movement.

3. A scale as claimed in claim 1, the dial carrying near said magnets a crown made of magnetic material.

References Cited by the Examiner

UNITED STATES PATENTS

| 2,907,846 | 10/1959 | Wilhelm | 200—87 |
| 2,973,414 | 2/1961 | Bossemeyer | 200—87 |
| 3,056,865 | 10/1962 | Reardon et al. | 200—56 |
| 3,187,129 | 6/1965 | McBrian | 200—87 |
| 3,198,902 | 8/1965 | Deshautreaux | 200—87 |

BERNARD A. GILHEANY, *Primary Examiner.*

B. DOBECK, *Assistant Examiner.*